Oct. 1, 1929.　　　T. W. W. FORREST　　　1,729,611
APPARATUS FOR FIG INSPECTION
Filed March 14, 1927
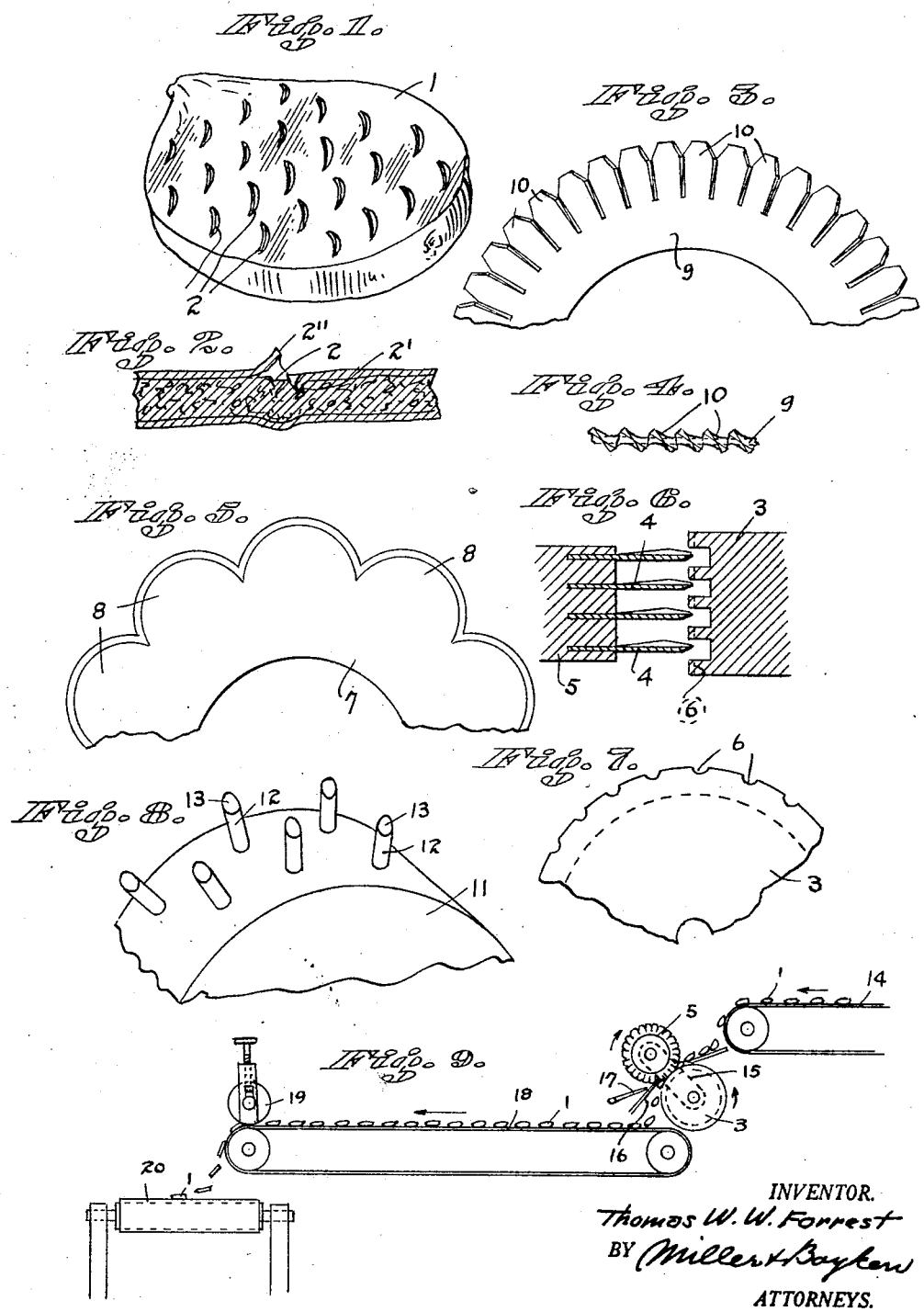

Patented Oct. 1, 1929

1,729,611

UNITED STATES PATENT OFFICE

THOMAS W. W. FORREST, OF FRESNO, CALIFORNIA, ASSIGNOR TO CALIFORNIA PEACH & FIG GROWERS ASSOCIATION, OF FRESNO, CALIFORNIA, A CORPORATION OF CALIFORNIA

APPARATUS FOR FIG INSPECTION

Application filed March 14, 1927. Serial No. 175,414.

This invention relates to a method for the inspection of the interiors of dried fruit such as dried figs, and to special apparatus for carrying out the method.

Figs when dried and processed ready for packing, tho outwardly of perfect appearance frequently include a certain percentage which are diseased internally, or impaired through attack of mold and small animal organisms of various kinds, with a result that the interior of the fig is partially or wholly filled with smut or black product of the diseased condition and which destroys the value of the pack.

The exterior of the fig frequently gives no indication of the impaired interior, in fact it often happens that a very fine looking specimen will upon being opened, be found to be badly infected with the condition described, and the objects of the present invention are to provide a method and apparatus for carrying out the method whereby the interiors of dried figs may be examined before packing the same, so that all figs with impaired or smutty interiors may at once be detected and discarded.

Also such a method and means which will provide for rendering substantially all portions of the interior of the fruit open to inspection, and which method may or may not leave an impression on the surface of the fruit by which such inspected fruit may be distinguished from un-inspected fruit.

Briefly described the method comprises passing the figs through apparatus and slitting their exteriors on one side at a plurality of points and turning back the edges of the slits so as to disclose the interior flesh at a plurality of points over the fig, then after visual inspection and the discarding of the diseased figs, to substantially close these slits again before packing for the market.

In the drawings hereto Figure 1 is a perspective view of a dried fig after having been subjected to my method. Figure 2 is an enlarged cross-section through one of the inspection slits of the fig just after forming. Figures 3 and 4 are respectively side and edge views of a segment of a disk cutter for producing the slits in the figs. Figure 5 is a side view of a segment of a modified form of disk cutter. Figure 6 is a sectional plan showing a portion of a set of cutters in working relation to a grooved supporting roll. Figure 7 is a side elevation of a portion of the roll of Figure 6. Figure 8 is a perspective view of a fragment of a gang slit cutter constructed of angularly sharpened punches, while Figure 9 is a reduced side elevation of an installation for continuously carrying out my method.

In further detail the fig 1 is relatively flat and spaced over one side are small slits 2 wherein the interior of the fig is freely exposed to view due to the fact that at least one edge of the slit is bent sidewise, either inward as at 2' or outward as at 2''.

The above shape of slit is the result of passing the figs between a pair of rolls one of which is notched or grooved and the other provided with cutting edges for slitting the surface of the fig against which it contacts.

In Figures 6 and 7 the working relation of a pair of rolls is shown, the roll 3 being grooved to receive the cutting blades 4 of roll 5, and the outer surface of grooved roller 3 is preferably transversely notched or roughened as at 6 so as to hold back the fruit while being slit by the revolving blades 4 of roll 5 as it is contemplated that the blade roll may revolve either faster or slower than the speed of the figs against roll 3 so that the knives will be given a twist or angular movement in the fig for opening up the edges of the slits as shown in Figure 2.

Figure 5 shows a circular cutting blade 7 with a scalloped edge 8 similar to a saw, and the scalloped teeth to be given a set if desired, tho free of set if the slots in the figs are to be manually opened by the inspectors after slitting.

Figures 3 and 4 show the preferred form of cutter 9 formed with spaced teeth 10 set at an angle to the plane of rotation so that each tooth will cut a slit in the fig and due to the angle as well as speed of travel relative to the fig will twist open the slits as the teeth leave the fruit.

The cutter of Figure 8 comprises a roll 11 with round punch-like devices 12 studded in its surface and each punch sharpened at a bevel at 13 so that instead of punching a series of round holes in the fruit the sharpened edge will enter first and the bevel will push the heavy skin of the fruit inward and sidewise to expose the flesh of the fig in each hole.

Other forms of cutters may be devised which will open up the cuts which they form, but to a certain extent the opened up condition is transitory since there is a partial natural closing of these slits if the disruption has not been too great.

If cutters as in Figure 5 without set are used the inspectors may quickly bend each fig backward thus opening up all the slits momentarily and closing them again upon straightening.

In carrying out my method as a continuous process in accordance with Figure 9 I feed the figs 1 between the supporting roll 3 and cutter roll 5 from a suitable feeder such as the conveyor 14. The rolls are suitably geared together as by chain and sprockets or otherwise as indicated at 15 and driven by power in direction of the arrows. A stripper 16 with prongs lying between the cutter blades insures stripping of the fruit from the cutters, while a steam jet at 17 directed adjacent the stripper prongs makes the fruit come away easier and keeps the prongs and blades from gumming up.

From the slitting cutters the figs fall slit side up to a traveling picking table or belt 18 along which the inspectors may stand to throw off any fruit appearing through its open slits to be inwardly defective, and at the end of the picking table the slits of the fruit may be passed under a roller 19 adjustable as to pressure on the fruit so as to close up the slits to any desired degree before discharging to the transversely moving packing table or belt 20.

It will be evident from the disclosure that the apparatus is susceptible of modifications while still functioning in the general manner described, and any such modifications as come within the spirit of the invention are intended to be included in the appended claims.

I claim:

1. Apparatus for preparing dried figs for internal inspection comprising a blade arranged and adapted to move against a fig, means supporting said fig against said blade, said blade being set at an angle to and formed relative to its path of motion so as to cut and spread an opening in the skin of the fig whereby the interior of the fig is exposed to view.

2. Apparatus for preparing dried figs for internal inspection comprising a plurality of spaced blades arranged and adapted to move against a fig, means supporting said fig against said blade, said blades being set at an angle to and formed relative to their path of movement so as to cut and spread open a plurality of slitted openings in the skin of the fruit whereby the interior of the fig is exposed to view.

3. Apparatus for preparing dried figs for internal inspection comprising a roll over which the figs are passed, a rotary gang cutter provided with slitting blades set at an angle to their path of motion arranged to operate upon the figs in passing over said roll for slitting the fruit, means for feeding figs to said roll, and means for stripping the slit figs from the cutter.

4. Apparatus for preparing dried figs for internal inspection comprising a roll over which the figs are passed, a rotary gang cutter arranged to operate upon the figs in passing over said roll for slitting the fruit, means for feeding figs to said roll, means for stripping the slit figs from the cutter, and a steam jet operating adjacent the stripper and blades at the point of removal of the fruit.

5. Apparatus for preparing dried figs for internal inspection comprising a roll over which the figs are passed, a rotary gang cutter arranged to operate upon the figs in passing over said roll for slitting the fruit, means for feeding figs to said roll, means for stripping the slit figs from the cutter, a traveling picking table arranged to receive the fruit slit sides up, and means at the end of the picking table tending to close the slits.

THOMAS W. W. FORREST.